United States Patent [19]
Willits

[11] B 3,997,782
[45] Dec. 14, 1976

[54] ROTARY PULSE TRANSDUCER HAVING STATOR SEALING MEANS

[75] Inventor: David L. Willits, Wadsworth, Ill.

[73] Assignee: Dynapar Corporation, Gurnee, Ill.

[22] Filed: Sept. 6, 1974

[21] Appl. No.: 503,618

[44] Published under the second Trial Voluntary Protest Program on March 9, 1976 as document No. B 503,618.

[52] U.S. Cl. .................. 250/231 SE; 250/239; 340/271; 356/138; 356/172
[51] Int. Cl.² .......................................... G01D 5/34
[58] Field of Search ......... 250/231 SE, 231 R, 233, 250/236, 239; 340/271; 356/138, 139, 152, 172

[56] References Cited
UNITED STATES PATENTS

| | | | |
|---|---|---|---|
| 3,421,012 | 1/1969 | Johnson, Jr. | 250/233 |
| 3,693,023 | 9/1972 | Wasserman | 250/231 SE |

Primary Examiner—Archie R. Borchelt
Assistant Examiner—E. R. La Roche
Attorney, Agent, or Firm—Andrus, Sceales, Starke & Sawall

[57] ABSTRACT

A rotary pulse transducer includes a housing having a pair of halves of similar dimensions. An annular photoelectric stator formed from a plastic sheet is employed as a sealing gasket between the halves of the transducer housing. During assembly of the transducer, the stator may be easily moved relative to the housing for alignment purposes by grasping exterior portions of the stator.

15 Claims, 3 Drawing Figures

ROTARY PULSE TRANSDUCER HAVING STATOR SEALING MEANS

BACKGROUND OF THE INVENTION

Field of the Invention

The present invention is directed to the construction of rotary pulse transducers and to the assembly and alignment of same.

BACKGROUND OF THE INVENTION

Description of the Prior Art

Rotary pulse transducers convert the mechanical rotation of a shaft into a train of pulses, typically electrical pulses. The rapidity of pulse generation is an indication of the rotary speed of the shaft and the number of such pulses is an indication of shaft position or the number of revolutions.

A common type of rotary pulse transducer employs photoelectric devices to produce the electrical pulses. A rotor having a plurality of radial opaque and transparent segments is mounted on the shaft in alignment with a similarly formed stator. A light source is mounted in the transducer housing to transmit a beam of light through the rotor and stator to a photoelectric receiver. Upon rotation of the shaft, the photoelectric receiver provides electrical pulses through the action of the opaque and transparent segments of the rotor alternately blocking and transmitting the beam of light passing through the segments in the stator.

Because of short data sampling times, it is often necessary to provide a large number of segments on the rotor and stator. For example, the rotor may contain five thousand segments. In order to keep the size of the transducer within the requirements dictated by industrial considerations, it has been necessary to employ a high degree of precision in the manufacture, assembly, and adjustment of the mechanical, electrical, and optical components of the transducer. Such precision has substantially increased the manufacturing costs.

It is often necessary to generate two trains of output pulses displaced with respect to each other, by for example 90 electrical degrees. Among other advantages, this permits the rotary pulse transducer to provide an indication of the rotary direction of the shaft. The two pulse trains require a plurality of light source-photoelectric receiver elements and may be provided by numerous techniques, such as displacing a portion of the stator or rotary ray-like pattern of segments by the desired displacement of the pulse train signal, the use of additional segments in one of the patterns, etc.

Prior to operating a rotary pulse transducer, it is necessary to accurately position the stator with respect to the other elements of the transducer so as to provide the desired signal generation. In transducers providing two pulse train signals it is necessary to provide the correct relationship between the two signals. This positioning is commonly termed alignment. However, due to the fact that the stator is surrounded by the housing and the housing must be assembled before alignment can take place, this has proven to be difficult in the past.

SUMMARY OF THE PRESENT INVENTION

It is, therefore, the object of the present invention to provide a rotary pulse transducer which may be aligned in the assembled condition in a simple and economical manner and which is capable of retaining its alignment over a wide range of ambient operating conditions. The ease and retention of alignment avoids the great precision and expense in the manufacture and assembly of the elements of the transducer formerly needed to obtain accurate alignment.

It is another object of the present invention to provide an improved rotary pulse transducer capable of providing a pair of accurately displaced pulse train signals.

It is yet another object of the present invention to provide an improved rotary pulse transducer in which the stator serves as a gasket for the housing halves.

Briefly, the present invention is directed to a transducer including a shaft mounted rotor supported by a housing comprised of a pair of halves, which may be identical in dimension. A photoelectric stator is located between the housing halves to act as a sealing means. Photoelectric sensing means operatively associated with the rotor and stator provide one or more output pulse trains from the rotary pulse transducer.

The photoelectric stator may be formed as a square sheet of transparent plastic material of greater dimensions than the transducer housing. During assembly of the pulse transducer, the position of the stator with respect to other elements in the assembled housing may be altered by grasping the exposed portions of the stator. This facilitates alignment of the rotary pulse transducer.

DESCRIPTION OF THE PREFEREED EMBODIMENT

Figure 1:
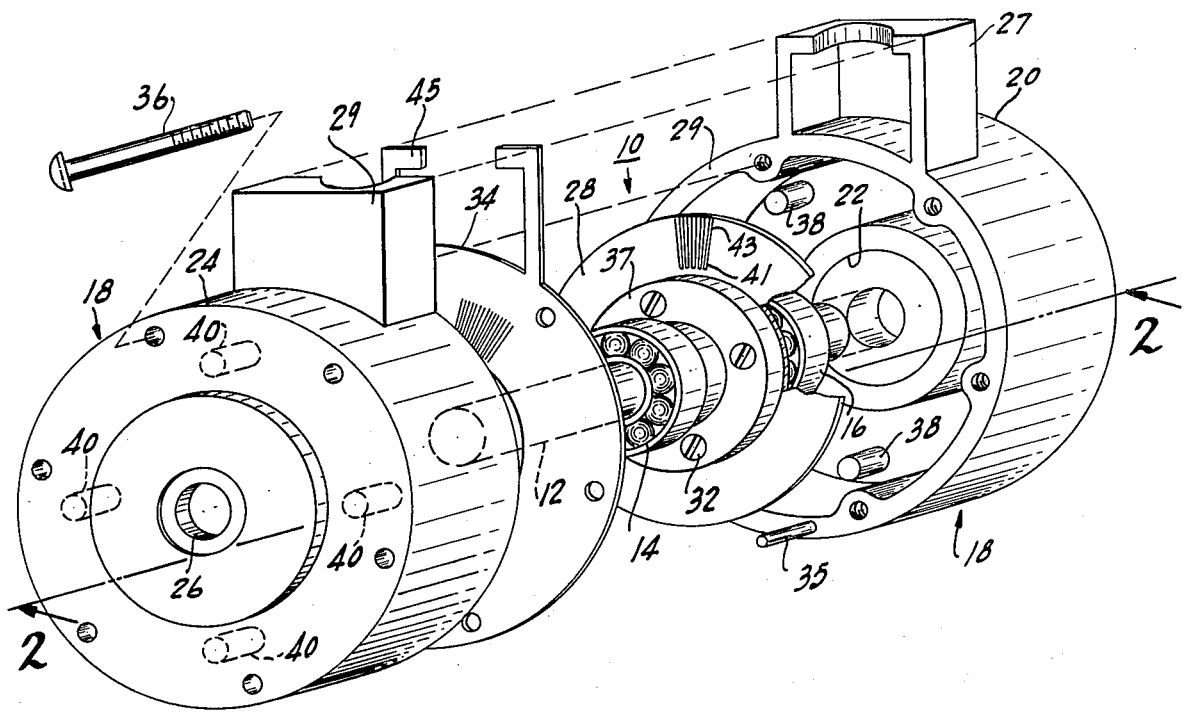
FIG. 1 is an exploded view of the improved rotary pulse transducer of the present invention.

Turning now to the Figures, there is shown in FIG. 1, the improved rotary pulse transducer 10 of the present invention. Rotary pulse transducer 10 includes shaft 12 embraced by front bearing 14 and rear bearing 16. Housing 18 of rotary pulse transducer 10 includes rear half 20 for receiving bearing 16 in recess 22. Housing 18 also includes front half 24 which receives bearing 14 and which contains hole 26 through which shaft 12 extends. The exposed end of shaft 12 may be coupled to, and driven by, equipment, not shown, for measuring the rotary speed or other operating phenomena of the equipment.

Each housing half 20 and 24 also contains a connector box portion 27 and 29, respectively. In the preferred embodiment of the invention, front and rear housing halves 24 and 20 may be identical with the exception of those variations attendant the extension of shaft 12 through front half 24. If desired, shaft 12 may extend through rear housing 26 for being coupled to additional equipment.

Figure 2:
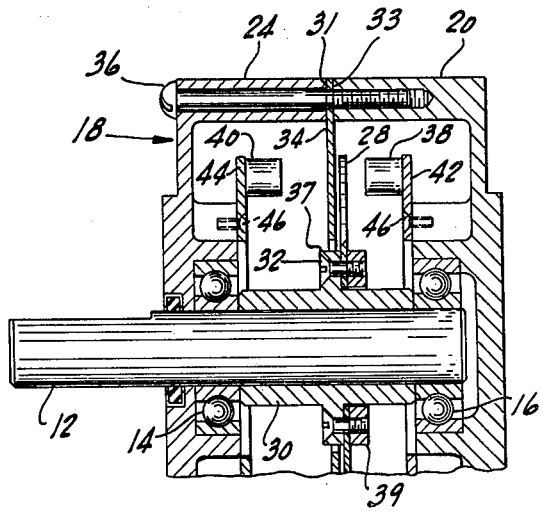
FIG. 2 is a fragmentary cross sectional view of portions of the improved rotary pulse transducer of the present invention taken along line 2—2 of FIG. 1.
Figure 3:
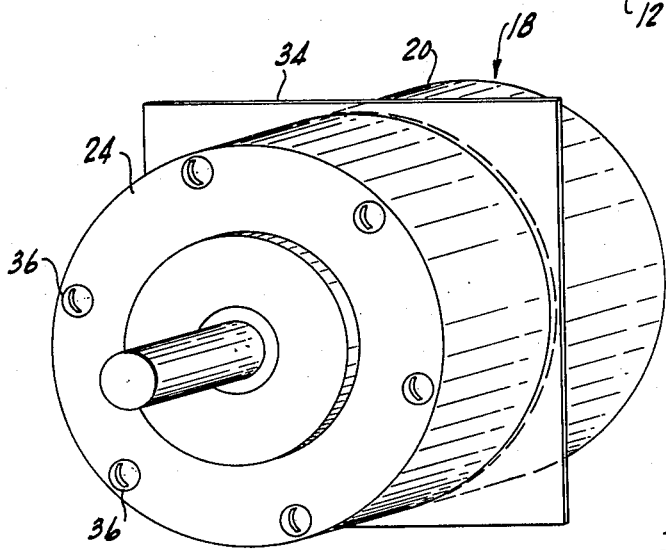
FIG. 3 is a perspective view showing assembly of the rotary pulse transducer.

Front housing half 24 and rear housing half 20 contain joinder surfaces 31 and 33, respectively, which are opposing when rotary pulse transducer 10 is assembled as shown in FIGS. 2 and 3. The joinder surfaces and the bearing recesses, such as recess 22 in rear housing half 20, may be machined on the same machine and in the same fixture. This feature, plus the identicality of the two halves, facilitates such machining and the provision of dimensional precision to housing 18 at minimal expense. In order to insure that half 20 and half 24 of housing 18 are properly aligned, a pair of alignment pins, one of which is shown in FIG. 1 by the numeral 35, extend between locating holes in the two housing halves.

Plate like photoelectric rotor 28 is mounted on shaft 12. For this purpose, flanged mounting hub 30 may be pressed on shaft 12. Photoelectric rotor 28 is placed on hub 30 and secured to shaft 12 by screws 32 extending through flange 37 and photoelectric rotor 28 and threaded into retaining ring (see FIG. 2) on the other side of the rotor.

Photoelectric rotor 28 is typically formed from a transparent plastic sheet. A pattern of alternating opaque radial segments 41 and transparent radial segments 43 are printed or photographically applied to photoelectric rotor 28.

Rotary pulse transducer 10 includes photoelectric stator or mask 34 containing a similar pattern of alternating opaque radial segments and translucent radial segments printed or photographically applied to a sheet of plastic.

In order to provide for a pair of pulse signals from rotary pulse transducer 10 which are displaced 90 electrical degrees, the pattern of rotor 28 may include one more ray than the pattern of stator 34. For example, the pattern of rotor 28 may contain five thousand and one rays while the pattern of stator 34 may contain five thousand rays.

As shown most clearly in FIG. 2, photoelectric stator 34 is positioned in alignment with photoelectric rotor 28 when rotary pulse transducer 10 is assembled. Photoelectric stator 34 is also placed between the opposing surfaces 31 and 33 of front half 24 and rear half 20 of housing 18 when the two housings are fastened together by bolts 36 which extend through holes in front housing half 24 and photoelectric stator 34 and are threaded in rear housing 20. An extension 45 of stator 34 may be used to seal connector halves 27 and 29. Photoelectric stator 34 thus serves as gasket between the housing halves to seal the housing against entry of moisture or other deleterious agents.

For this reason, it is preferable to form photoelectric stator from a sheet of plastic which is relatively stable under varying temperature and humidity conditions. It is also desirable that the thermal expansion characteristics of the plastic approximate those of the material forming housing halves 20 and 24 and that the plastic resist cold flow. Housing 18 may typically be formed from aluminum alloy. In this case, photoelectric stator 34 may be formed of a polyesther terephthalate, such as that sold by E. I. du Pont de Nemours and Company under the trademark "Mylar."

A plurality of photoelectric emitter and receiver units are positioned within housing 18 so as to have a transmission path which extends between the segments of photoelectric stator 34 and photoelectric rotor 28. Such photoelectric units include sources of radiant energy, such as light emitting diodes 38, mounted in rear housing half 20 which provide beams of radiant energy through photoelectric rotor 28 and photoelectric stator 34.

The beams fall on photoelectric sensors, such as phototransistors 40, which are located in front housing half 24. Four such photoelectric units may be spacedly positioned 90 mechanical degrees about the interior of housing 18. Light emitting diodes 38 and phototransistors 40 may be mounted on printed circuit boards 42 and 44 containing printed conductors for the emitter and sensor elements. Printed circuit boards 42 and 44 are connected to front and rear housing halves 20 and 24 by screws 46. Two diametrically opposite photoelectric units are coupled together electrically to provide one of the two output signals from rotary pulse transducer 10. A pair of photoelectric units is utilized in the generation of each signal to cancel out minor manufacturing tolerances. The necessary electrical connections to and from the photoelectric emitter-sensor units in transducer 10 are obtained through an electrical plug, not shown, which seals the opening in connector box comprised of halves 27 and 29.

In fabricating photoelectric stator 34, the stator is formed by printing the ray like pattern on a rectangular sheet of plastic having dimensions greater than those of housing 18. The central hole for shaft 12, the peripheral holes for bolts 36 and alignment pins 35, and the interior hole in extension 45 are provided in the sheet of plastic. The various elements of rotary pulse transducer are assembled in the front and rear housing halves 20 and 24 and the two halves moved into alignment with photoelectric stator 34 between the two halves. The halves are then loosely assembled with bolts 36, as shown in FIG. 3, and properly located with respect to each other by alignment pins 35.

The appropriate electrical connections are then made at connector box 27–29 to an indicating means, such as an oscilloscope, for indicating the relative position of photoelectric stator 34 with respect to the photoelectric sensor and receiver units in housing 18. The desired alignment of the stator with respect to the photoelectric units and the other elements of transducer 10 may then be obtained by grasping the exposed portion of stator 34 and manually moving it into the desired position. Typically, stator 34 is moved until it is exactly concentric with shaft 12. In transducers in which a pair of pulse trains are generated, the stator may be rotated until the leading edge of the pulse signal generated by one pair of photoelectric units occurs midway through the pulse signal generated by the other pair of photoelectric units, thereby providing the 90 electrical degree displacement of the two signals. The holes in stator 34 through which bolts 36 and alignment pins 35 extend may be sufficiently large to permit the necessary movement of stator 34. Thereafter, bolts 36 are tightened to retain stator 34 in the desired position and the excess portion of stator 34 removed by an appropriate cutting tool to complete the assembly of rotary pulse transducer 10.

Various modes of carrying out the invention are contemplated as being within the scope of the following claims particularly pointing out and distinctly claiming the subject matter which is regarded as the invention.

I claim:

1. An improved rotary pulse transducer comprisng:
   a shaft;
   a photoelectric rotor mounted on said shaft;
   a housing having bearing means rotatably supporting said shaft, said housing being comprised of portions having opposing joinder surfaces;
   an annular photoelectric stator located in alignment with said photoelectric rotor, said stator being sealingly interposed between the abutting contiguous joinder surfaces of said housing halves; and photoelectric sensing means operatively associated with said photoelectric rotor and stator for ascertaining relative rotation of said rotor with respect to said stator.

2. The improved rotary pulse transducer of claim 1 wherein said photoelectric stator extends entirely across said abutting surfaces and has a peripheral edge exposed on the exterior of the housing.

3. The improved rotary pulse transducer of claim 1 wherein said housing portions comprise a pair of housing halves.

4. The improved rotary pulse transducer of claim 1 wherein said opposing joinder surfaces are normal to the axis of said shaft.

5. The improved rotary pulse transducer of claim 3 wherein said halves have substantially identical dimensions.

6. The improved rotary pulse transducer of claim 1 wherein said photoelectric stator is formed of a sheet of film having dimensional stability properties approximating those of the material from which said housing halves is formed.

7. The improved rotary pulse transducer of claim 2 wherein said stator includes means for permitting limited movement of said stator with respect to said housing halves.

8. The improved rotary pulse transducer of claim 7 wherein said housing halves are joined by bolts extending between said halves and through holes in said stator, said holes being greater in size than the dimensions of said bolts.

9. The improved rotary pulse transducer of claim 1 wherein said photoelectric sensing means provides a pair of phase displaced output pulse train signals.

10. A method of assembling and aligning a rotary pulse transducer having a pair of housing portions with contiguous joinder surfaces and containing signal generating means operatively associated with a relatively movable rotor and stator for providing an output signal, said method comprising the steps of:
   orienting the portions so that the joinder surfaces are contiguous;
   inserting the stator between the contiguous joinder surfaces of the housing portions;
   moving the stator with respect to the housing to provide a desired output signal; and
   joining the portions and the stator together.

11. The method of claim 10 wherein the stator has an exterior portion extending outside the housing portions and the step of moving the stator further defined as grasping the exterior portions of the stator and moving the stator.

12. The method of claim 10 wherein the method is further defined as loosely joining the housing portions and the stator together so as to permit relative movement between the stator and housing; moving the stator with respect to the housing, and thereafter securing the halves and the stator together.

13. The method of claim 10 further defined as removing the exterior portion of the stator after moving the stator.

14. The method of claim 10 wherein the signal generating means is further defined as providing a pair of phased displaced output signals and the step of moving the stator is further defined as moving the stator to provide the desired phase displacement between the pair of output signals.

15. The method of claim 10 wherein the rotor is on a shaft mounted in journals in the housing portions, said method including a preliminary step of machining the journals and contiguous joinder surfaces in the same fixture.

* * * * *